United States Patent
Caddell et al.

[11] Patent Number: 5,957,284
[45] Date of Patent: Sep. 28, 1999

[54] FLOATING, TRANSPARENT PROTECTIVE COVERING FOR A FISHING ROD

[75] Inventors: Douglas E. Caddell, Roswell; Robert P. Misita, Cumming, both of Ga.

[73] Assignee: U.B.S. Enterprises, Cumming, Ga.

[21] Appl. No.: 08/977,411

[22] Filed: Nov. 24, 1997

[51] Int. Cl.[6] .................................................. A01K 97/08
[52] U.S. Cl. ...................................... 206/315.11; 206/594
[58] Field of Search ........................... 206/315.1, 315.11, 206/443, 446, 594

[56] References Cited

U.S. PATENT DOCUMENTS

| | | | |
|---|---|---|---|
| 3,131,503 | 5/1964 | Gottula | 43/26 |
| 3,621,994 | 11/1971 | Brown | 206/446 |
| 3,662,933 | 5/1972 | Michal | 224/42.1 E |
| 3,987,574 | 10/1976 | Pennino | 43/26 |
| 4,136,478 | 1/1979 | Wycosky | 43/26 |
| 4,216,604 | 8/1980 | Starke | 42/25.2 |
| 4,222,193 | 9/1980 | Beck | 43/26 |
| 4,530,178 | 7/1985 | Rauschser | 43/26 |
| 5,056,256 | 10/1991 | Truax | 43/25.2 |
| 5,213,215 | 5/1993 | Prevot | 206/446 X |
| 5,277,306 | 1/1994 | Sargent | 206/315.011 |
| 5,293,711 | 3/1994 | Robinson | 43/26 |
| 5,417,354 | 5/1995 | Jones | 224/202 |
| 5,515,641 | 5/1996 | D'Alessandro | 43/26 |
| 5,515,971 | 5/1996 | Segrest | 206/446 X |

*Primary Examiner*—Jacob K. Ackun
*Attorney, Agent, or Firm*—Bernstein & Associates, P.C.

[57] ABSTRACT

A protective cover (7) that functions as a carrying case and a protective sheath. The cover (7) comprises an enclosure (13) for covering a portion of a rod (10). The enclosure (13) defines a space around the rod (10) and provides protection for the tip of the rod (10). A spacer insert (16) that opens in a hinged fashion surrounds a portion of the rod (10) and occupies the space between the portion of the rod (10) and the inside of the enclosure (13). The spacer insert (16) fits snugly inside the cover (7) to prevent excess motion of the rod (10) inside the enclosure (13) and to prevent the cover (7) from separating from the end of the rod (10).

17 Claims, 2 Drawing Sheets

FLOATING, TRANSPARENT PROTECTIVE COVERING FOR A FISHING ROD

FIELD OF THE INVENTION

The present invention pertains generally to protective covers for elongate objects such as rods, and specifically to a protective cover for a fishing rod suitable for pressure fishing situations and the transporting of multiple rods.

BACKGROUND

When transporting or storing elongate objects which are fragile or which have attachments which may have sharp edges due care must be taken in order to prevent damage to the object itself or to other objects.

The typical uses of a fishing rod and reel subject the user and the equipment to some well known hazards. The main hazard to the user is the hooks which are typically left attached to the rod while fishing with another rod and when the rods are not in use. To secure the lure or hook to the pole, the lure or hook is usually attached to the rod by letting the hook or lure extend away from the last eyelet a short distance and then looping the lure back from the end of the rod onto one of the lower eyelets attached to the rod. Once the hook is positioned in the eyelet, the slack is taken out of the fishing line by the take-up mechanism in the reel.

When rods are stored with the hooks attached, the hooks pose a danger of snagging for children, pets, and items that the hook comes into contact with during storage and transport. Also, during competition a fisherman may alternate between as many as five to ten rods, and in a pressure situation if two rods become tangled, precious time may be lost in separating the rods.

This practice of storing fishing rods with the hooks and/or lures attached creates problems in rod lockers on boats and in storage areas at the home. Also, when transporting multiple fishing rods, the hooks can become tangled with the other rods and fishing lines.

The rod itself and especially the tip is also susceptible to damage during transport and storage. The end or tip of the fishing rod is usually the thinnest portion of the rod and the point where the last eyelet for the fishing line is attached. Depending on several variables including the quality of the manufacturing of the rod, the type of materials used for construction of the rod, and the amount of abuse that the rod is subjected to, the end of a fishing rod is usually susceptible to damage (including the end or the eyelet simply breaking off) during use, storage, and or transport of the fishing rod. The tip of the rod can become caught in areas where dislodging it can subject the end of the rod to forces strong enough to break it.

A problem that occurs mainly with fishing from boats or fishing from within bodies of water is the loss of a fishing rod from accidentally dropping it into the water. This problem can occur during use of the rod but can also occur during transport or storage of the rod.

There have been several attempts at protective covers and carrying cases for fishing rods which have been directed at protecting the rod and/or the reel. Others are directed at protecting and carrying several rods at once.

What is needed is a cover that is buoyant and that removably attaches to the end of a fishing rod, that supports the rod inside an enclosure so that the cover protects the tip of the rod, prevents snags from occurring, provides visual access to the tackle, prevents the rod from moving around in the cover, prevents the cover from separating from the rod, and attaches to other covers for transporting multiple rods.

SUMMARY OF THE INVENTION

The present invention provides a protective covering for the thinner more fragile end of a rod. The covering provides an enclosure that defines a space surrounding the rod and tackle. The covering also provides a support that surrounds a portion of the rod and occupies the space between the rod and the inner surface of the enclosure along the portion of the rod where it is located.

In a preferred embodiment, the present invention provides an elongate, substantially rigid enclosure defining a space surrounding a fishing rod and having an opening for insertion of the fishing rod. The enclosure is transparent to enable the user to see what type of fishing tackle is attached to the end of the rod. The outside of the enclosure is equipped with a hook and loop fastener so that multiple rods having the enclosure of the present invention can be attached to one another for easy transport.

A spacer insert for maintaining the position of the rod within the enclosure has a slot defined therein capable of receiving a portion of the fishing rod. The spacer insert is cylindrical with a tapered end and is capable of substantially occupying a portion of the space surrounding the fishing rod inside the enclosure. The spacer insert preferably has a slot defined therein with a hinged portion capable of opening the slot to receive the fishing rod. Once the rod is inside the insert and the insert is positioned inside the enclosure, the insert restricts the movement of the rod and prevents the enclosure from separating from the rod.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
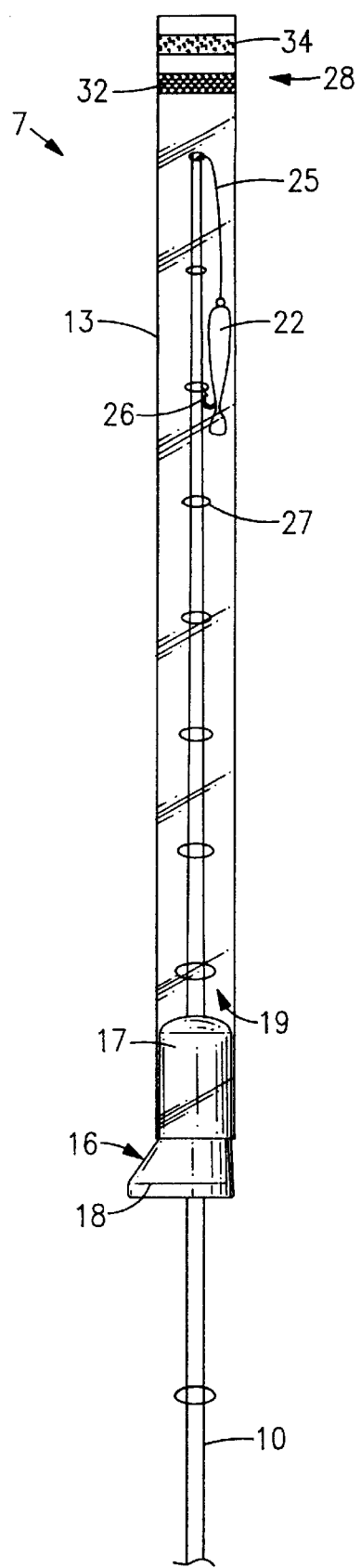
FIG. 1 is a front elevation view of the protective cover of the present invention shown in conjunction with a fishing rod.

Referring generally to FIGS. 1–5, and initially referring to FIG. 1, a protective covering 7 is shown in use with a fishing rod 10. The covering 7 comprises an enclosure 13 and a spacer insert 16. The enclosure 13 is preferably cylindrical and constructed of a durable, water resistant material, that is substantially rigid. The preferred material is proprionate which is a cellulose based plastic. The enclosure 13 is transparent which provides the user with the ability to visually inspect the tackle that is attached to the fishing rod 10. This feature is important because typically the user will be transporting several rods at once and may have a need to identify the type of tackle that is attached to the end of the fishing line 25 for different fishing conditions. During the periods when the rod 10 is not being used, most fishermen place the hook 26 on the lure 25 into one of the eyelets 27 attached to the rod 10. Once the hook 26 is positioned in the eyelet 27, the slack is taken out of the fishing line 25. By storing the rod 10 with the lures 25 and hooks 26 attached, the probability of damage to the rod 10 and to anything that comes into contact with the hooks 26 or lures 25 on the rod is increased. Accordingly, the present invention provides a means for reducing the risks associated with storing and transporting a fishing rod 10 in this manner.

The outside of the enclosure 13 is equipped with strips of hook and loop fasteners 28 with one set male 32 and the other set female 34. The fasteners 28 enable the enclosure 13 to be attached to other enclosures 13 of the same type for easier carrying and storage.

A spacer insert 16 is preferably cylindrical with a rounded front end 17 and a tapered back end 18. The preferred material for the insert 16 is closed cell foam which is buoyant. The taper is formed by a section having gradually decreasing diameter between the back end 18 and the front end 17 of the insert 16. The taper of the insert 16 enables the insert 16 to be inserted into the enclosure 13 up to a point where the outside diameter of the insert 16 is equal to or greater than the inside diameter of the enclosure 13. The front end 17 of the insert 16 engages with the inner surface 19 of the enclosure 13 by a friction fit. After the insert 16 is inserted into the enclosure 13 up to the point where the larger diameter section reaches the end of the enclosure 13, the taper of the insert 16 creates a stop like a cork to prevent the insert 16 from going all the way into the enclosure 13.

Figure 2:
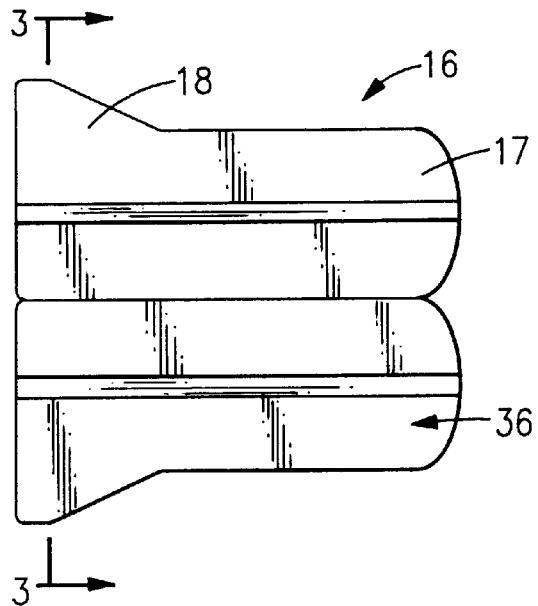
FIG. 2 is a plan view of the spacer insert in the open position.

Turning to FIG. 2, the inset 16 has a slot 36 formed along its longitudinal axis. The slot 36 provides an opening for inserting the fishing rod 10 into the insert 16. The spacer insert 16 maintains the fishing rod 10 in its desired position by preventing the enclosure 13 from sliding off of the rod 10 and by restricting the movement of the rod 10 within the enclosure 13. The spacer insert 16 is preferably designed to fit snugly into the enclosure 13 to prevent any significant axial or lateral movement of the rod 10 within the enclosure 13.

The protective covering 7 is preferably buoyant in order to facilitate retrieval of a rod 10 that may be accidentally dropped into the water. The buoyancy results from the choice of materials for the enclosure 13 and for the spacer insert 16.

Figure 3:
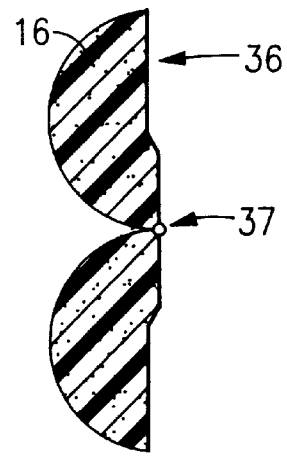
FIG. 3 is a sectional view of the spacer insert in the open position taken along line 33.
Figure 4:
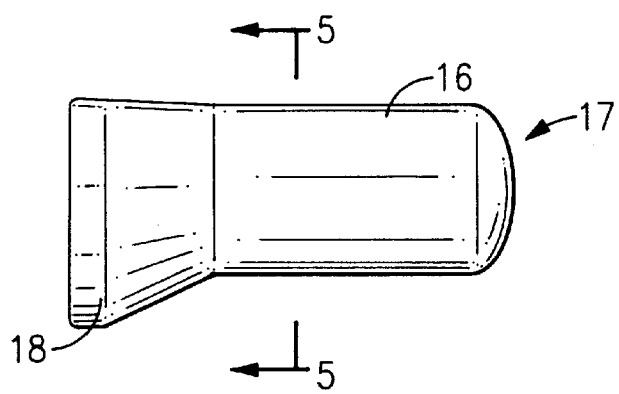
FIG. 4 is a plan view of the spacer insert in the closed position.
Figure 5:
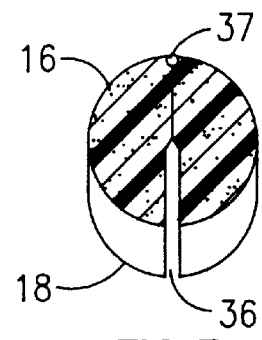
FIG. 5 is a sectional view of the spacer insert in the closed position taken along line 5—5.

Turning to FIGS. 2–5, the slot 36 divides the insert 16 into two approximately equal halves. As shown in FIG. 3, the slot 36 can be extended for a portion of the insert 16 which connects to a hinged portion 37 that extends along the remainder of the insert 16. The hinged portion 37 enables the spacer insert 16 to be opened for insertion of the fishing rod 10.

In order to use the invention, the slot 36 in insert 16 is opened and placed around the rod 10 between a pair of the eyelets 27. The insert 16 encloses a portion of the rod 10 and a portion of the line 25. Once the insert 16 is placed on the rod 10, the rod 10/insert 16 combination is placed into the enclosure 13. The tapering of the insert 16 enables insert 16 to wedge against the inner surface 19 of the enclosure 13. With the insert 16 frictionally fitting inside the enclosure 13 and the larger end 18 wedging into the enclosure 13, movement of the rod 10 is restricted.

Once an individual rod 10 is secured in the covering 7, other coverings 7 holding other rods can be attached by the fasteners 28.

By enclosing the end of the rod 10 opposite the reel (not shown), the invention offers several advantages. The protective covering 7 prevents breaking the tip of the rod 10 because the covering makes it less likely that the tip will get hung up somewhere where removing it will create force sufficient at the end of the rod to snap the tip off. Also, the covering 7 eliminates the possibility of snagging the hook 26 with other rods 10 or snagging the hook 26 on contact surfaces during transport.

Further, the hardened end of the insert 13 reduces the risk of breakage from stepping on the end of a rod.

Other advantages include buoyancy of the protective covering 7 which can prevent the accidental loss of a rod 10. Also, the protective covering 7 is completely transparent which enables the user to determine which tackle is on rod 10. When several rods 10 are transported at once, the ability to identify the tackle is important to retrieve the appropriate rod for the fishing objectives and conditions.

In order to facilitate the handling of multiple rods 10, the hook and loop fasteners 28 provide for attachment of one protective cover 7 to another. Other types of fasteners such as hooks, male/female couplings, tape and straps could also be used.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A protective covering for a fishing rod, comprising:
   a) an elongate enclosure having an inner surface defining a space capable of at least partially enclosing the fishing rod and having an opening defined in at least one end of the enclosure, the opening capable of receiving the fishing rod; and,
   b) a spacer insert capable of receiving a portion of the fishing rod, the spacer insert comprising a first member and a second member and a groove defined axially therebetween, the spacer insert having a first portion with an outer surface capable of frictionally engaging with a portion of the inner surface of the enclosure to removably maintain the insert in the enclosure, the first portion having a length less than the length of the enclosure, and the spacer insert having a tapered second portion larger than the first portion to prevent the second portion from being received within the enclosure.

2. The protective covering of claim 1, wherein a portion of the enclosure is transparent.

3. The protective covering of claim 2, further comprising: a fastener disposed on the outside of the enclosure.

4. The protective covering of claim 3, wherein the fastener is a hook and loop fastener.

5. The protective covering of claim 1, wherein the first and second members are hingedly connected.

6. The protective covering of claim 1, wherein the enclosure is cylindrical.

7. The protective covering of claim 6, wherein the insert is generally cylindrical.

8. The protective covering of claim 1, wherein the insert is made of a buoyant material.

9. The protective covering of claim 8, wherein the enclosure and the insert cooperate to form an air pocket within the enclosure.

10. A protective covering for a fishing rod, comprising:
    a) an elongate, cylindrical, rigid enclosure having an inner surface defining a space capable of at least partially enclosing the fishing rod and having an opening defined in at least one end of the enclosure, the opening capable of receiving the fishing rod; and, b) a spacer insert capable of receiving a portion of the fishing rod, the spacer insert comprising a first member having a generally semicircular cross-section and a second member having a generally semicircular cross-section, the first and second members cooperating to generally form a cylinder, the first and second members having an axial groove defined substantially through the diameter of the cylinder, the first and second members hingedly connected together to permit the first and second members to rotate about the hinged connection to an open position to receive a portion of the fishing rod and to rotate about the hinged connection to a closed position to maintain a portion of the fishing rod fixedly in place, the spacer insert having a first portion with an outer surface capable of frictionally engaging with a portion of the inner surface of the enclosure to removably maintain the insert in the enclosure, the first portion having a length less than the length of the enclosure, and the spacer insert having a second portion tapered larger than the first portion to prevent the second portion from being received within the enclosure.

11. The protective covering of claim 10, wherein the insert is made of a buoyant material.

12. The protective covering of claim 11, wherein the enclosure and the insert cooperate to form an air pocket within the enclosure.

13. The protective covering of claim 12, wherein the buoyancy of the insert is greater than the buoyancy of the air pocket.

14. The protective covering of claim 12, wherein the buoyancy of the protective covering is greater than the weight of the fishing rod.

15. The protective covering of claim 10, wherein the slot extends along a substantial portion of the spacer insert and the hinged portion extends along a remaining portion of the spacer insert.

16. The protective covering of claim 10, wherein the slot is defined by two opposing surfaces for cooperating to receive and prevent movement of the fishing rod.

17. The protective covering of claim 16, wherein at least one of the two opposing surfaces has a recessed portion for receiving and preventing movement the fishing rod.

* * * * *